US012703082B2

(12) United States Patent
Zimmer et al.

(10) Patent No.: US 12,703,082 B2
(45) Date of Patent: Aug. 11, 2026

(54) MACHINING ROBOT FOR CHIP REMOVAL MACHINING

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 881 days.

(21) Appl. No.: 17/924,428

(22) PCT Filed: May 11, 2021

(86) PCT No.: PCT/DE2021/000087
§ 371 (c)(1),
(2) Date: Nov. 10, 2022

(87) PCT Pub. No.: WO2021/228296
PCT Pub. Date: Nov. 18, 2021

(65) Prior Publication Data

US 2023/0330840 A1 Oct. 19, 2023

(30) Foreign Application Priority Data

May 12, 2020 (DE) ..................... 10 2020 002 815.2

(51) Int. Cl.
*B23P 23/02* (2006.01)
*B23C 1/12* (2006.01)
(Continued)

(52) U.S. Cl.
CPC ................. *B25J 9/046* (2013.01); *B23C 1/12* (2013.01); *B23P 23/02* (2013.01);
(Continued)

(58) Field of Classification Search
CPC ........ B25J 15/0057; B25J 9/1628–1653; B25J 9/046–9/047; B23Q 39/00–39/048;
(Continued)

(56) References Cited

U.S. PATENT DOCUMENTS 10,365,640 B2 7/2019 Baseman et al.
2004/0012359 A1* 1/2004 Katoh ................. B23Q 1/0009 318/560

(Continued)

FOREIGN PATENT DOCUMENTS

CN 102161161 A 8/2011
CN 107889475 A 4/2018

(Continued)

*Primary Examiner* — Erica E Cadugan
(74) *Attorney, Agent, or Firm* — Smartpat PLC

(57) ABSTRACT

A machining robot for machining workpieces by chip removal has two rotating main axes parallel with one another and at least two rotating subsidiary axes. A foot lever mounted in a first main axis and an elbow lever mounted at the free end of the foot lever in a second main axis form a kinematic chain. A first subsidiary axis is oriented in the longitudinal direction of the elbow lever. A second subsidiary axis mounts a machining unit in the elbow lever. The first main axis is mounted in the base frame. The machining unit is a multi-function unit through which the second subsidiary axis passes, and which has at least two working sides. One working side is a multifunction side, and the other working side is a main spindle side. The multifunction unit has at least two chip removal tools that can be driven for rotation.

13 Claims, 8 Drawing Sheets

(51) Int. Cl.

| | |
|---|---|
| ***B23Q 1/48*** | (2006.01) |
| ***B25J 9/04*** | (2006.01) |
| ***B25J 11/00*** | (2006.01) |
| ***B25J 13/00*** | (2006.01) |
| ***B25J 15/00*** | (2006.01) |
| ***B25J 21/02*** | (2006.01) |
| *B25J 9/16* | (2006.01) |
| *B25J 13/08* | (2006.01) |
| *B25J 21/00* | (2006.01) |

(52) U.S. Cl.

CPC ....... *B25J 11/0055* (2013.01); *B25J 15/0057* (2013.01); *B25J 15/0066* (2013.01); *B23Q 1/4885* (2013.01); *B25J 9/162* (2013.01); *B25J 9/1628* (2013.01); *B25J 13/088* (2013.01); *B25J 21/00* (2013.01); *Y10S 901/09* (2013.01); *Y10S 901/15* (2013.01); *Y10S 901/49* (2013.01); *Y10T 29/5107* (2015.01); *Y10T 409/309296* (2015.01)

(58) Field of Classification Search

CPC . Y10T 408/36–385; Y10T 409/307168; Y10T 409/307784; Y10T 409/308344; Y10T 409/308568; Y10T 409/309296; Y10T 409/30448; B23B 39/16–39/24; B23B 27/0023; B23C 1/04; B23C 1/08; B23C 1/10; B27C 3/04; G05B 2219/45083; Y10S 901/09; Y10S 901/15

USPC .... 408/31–53; 409/192, 203, 213, 217, 230, 409/144; 29/26 R–26 B; 318/568.11–568.25; 700/245–264; 901/9, 15

See application file for complete search history.

(56) References Cited

U.S. PATENT DOCUMENTS

| | | | | |
|---|---|---|---|---|
| 2008/0295311 | A1* | 12/2008 | Sturm | B23B 39/16 29/26 A |
| 2011/0085870 | A1 | 4/2011 | Zimmer et al. | |
| 2011/0200406 | A1 | 8/2011 | Lang et al. | |
| 2014/0309779 | A1* | 10/2014 | Niu | B25J 13/088 700/258 |
| 2015/0063936 | A1* | 3/2015 | Azzarello | B25J 11/005 901/41 |
| 2015/0298343 | A1 | 10/2015 | Jung et al. | |
| 2018/0065192 | A1 | 3/2018 | Kschier et al. | |
| 2018/0141174 | A1 | 5/2018 | Mori et al. | |
| 2018/0290249 | A1 | 10/2018 | Kschier et al. | |
| 2018/0333790 | A1* | 11/2018 | Urban | B23Q 39/024 |
| 2019/0265686 | A1 | 8/2019 | Obata et al. | |
| 2020/0024853 | A1 | 1/2020 | Furrer et al. | |

FOREIGN PATENT DOCUMENTS

| | | | |
|---|---|---|---|
| CN | 110036162 | A | 7/2019 |
| DE | 19930173 | A1 | 1/2001 |
| DE | 112016002368 | | 2/2018 |
| DE | 102016216902 | A1 | 3/2018 |
| DE | 102017012075 | A1 | 7/2018 |
| EP | 3474091 | A1 | 4/2019 |
| JP | H06290165 | A | 10/1994 |
| JP | 2001318712 | A | 11/2001 |
| JP | 2019145042 | A | 8/2019 |
| WO | WO-2006/030084 | A1 * | 3/2006 |
| WO | 2009121343 | A1 | 10/2009 |
| WO | 2015123349 | A2 | 8/2015 |

* cited by examiner 41
1Ø
21
27

51
71
23
4
5
1Ø
71
6
7

MACHINING ROBOT FOR CHIP REMOVAL MACHINING

TECHNICAL FIELD

The disclosure relates to a machining robot for machining workpieces by chip removal.

BACKGROUND

A machining robot with welding tools is known from DE 11 2016 002 368 T5. The use of such a machining robot for machining operations by chip removal can lead to increased wear of the bearings.

SUMMARY

The present invention is based on the problem of providing a stable machining robot for chip removal machining with a wear-resistant structure.

This problem is solved with the features of the main claim. A machining robot for machining workpieces by chip removal has two rotating main axes parallel with one another and at least two rotating subsidiary axes. A foot lever is mounted in a first of said main axes and an elbow lever mounted at the free end of the foot lever in the second of said main axes form a kinematic chain. A first of said subsidiary axes is oriented in a longitudinal direction of the elbow lever. A second of said subsidiary axes mounts a machining unit in the elbow lever.

The first main axis is mounted in the base frame. The machining unit is a multifunction unit through which the second subsidiary axis passes, and which has at least two working sides. One working side is a multifunction side, and the other working side is a main spindle side. The multifunction unit has at least two chip removal tools that can be driven for rotation individually, in groups and also in common. Each of these tools can be raised and lowered relative to the multifunction side by means of a tool lifting device that receives this tool. The main spindle side has a drivable main spindle holder and is designed with or without torque support. In addition, at least the first main axis, the second main axis and the second subsidiary axis are controlled in a common closed-loop control circuit, such that each working side can be moved relative to a working plane at a constant setting angle enclosed between such working side and the working plane.

The described machining robot has two pivot axes parallel with one another, through which a first pivot axis passes the base frame. Thus, the main working space of the machining robot is limited to a section shaped as a sickle section of a normal plane to the first main axis. The elbow lever of the machining robot carries the machining unit, which is designed as a multifunction unit with a plurality of working sides. One of the working sides is a multifunction side on which several driven tools, for example drills, milling cutters, saws, etc. are arranged. Such tools can be driven individually or in groups, for example by means of a common drive motor arranged in the multifunction unit. In order to use such tools, each of the tools is moved from a retracted rest position to an extended operating position by means of a tool lifting device. An additional working side of the multifunction unit is a main spindle side. This has both a main spindle holder and a torque support. This means that, for example, individual tools can be used and tool units can be attached by means of a tool changer. The integration of the setting angle of the individual working side into the control loop of the main axes enables, for example, the production of long saw cuts and regular hole patterns. This means that the machining robot can be used for a wide variety of machining tasks with a compact, deformation-resistant structure. The low moment loads on the bearing points resulting from the structure enable a long service life.

Further details of the invention will be apparent from the subclaims and the following description of schematically illustrated embodiments.

DETAILED DESCRIPTION

Figures 1, 2:
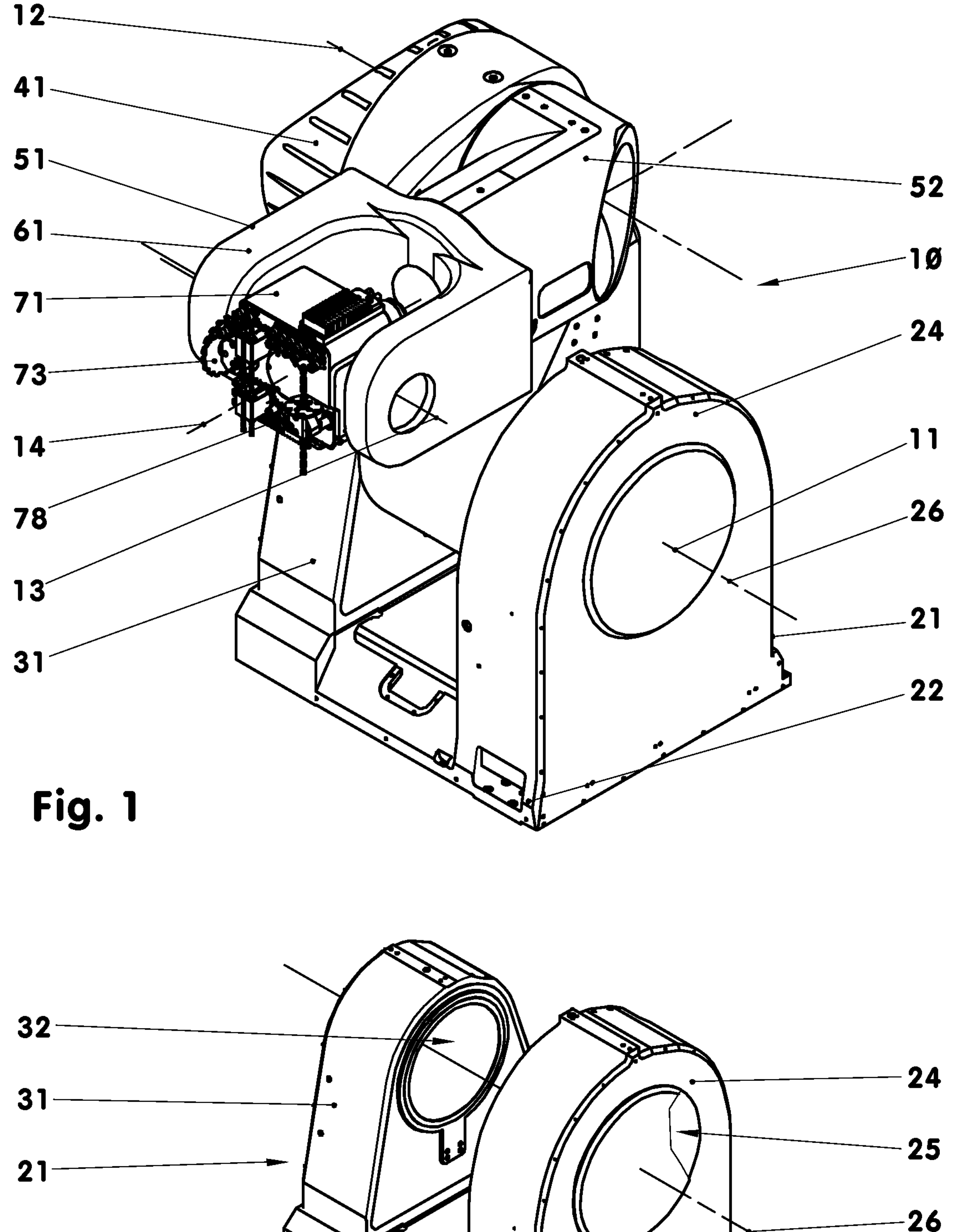
FIG. 1: Machining robot.
FIG. 2: Base frame.
Figure 3:
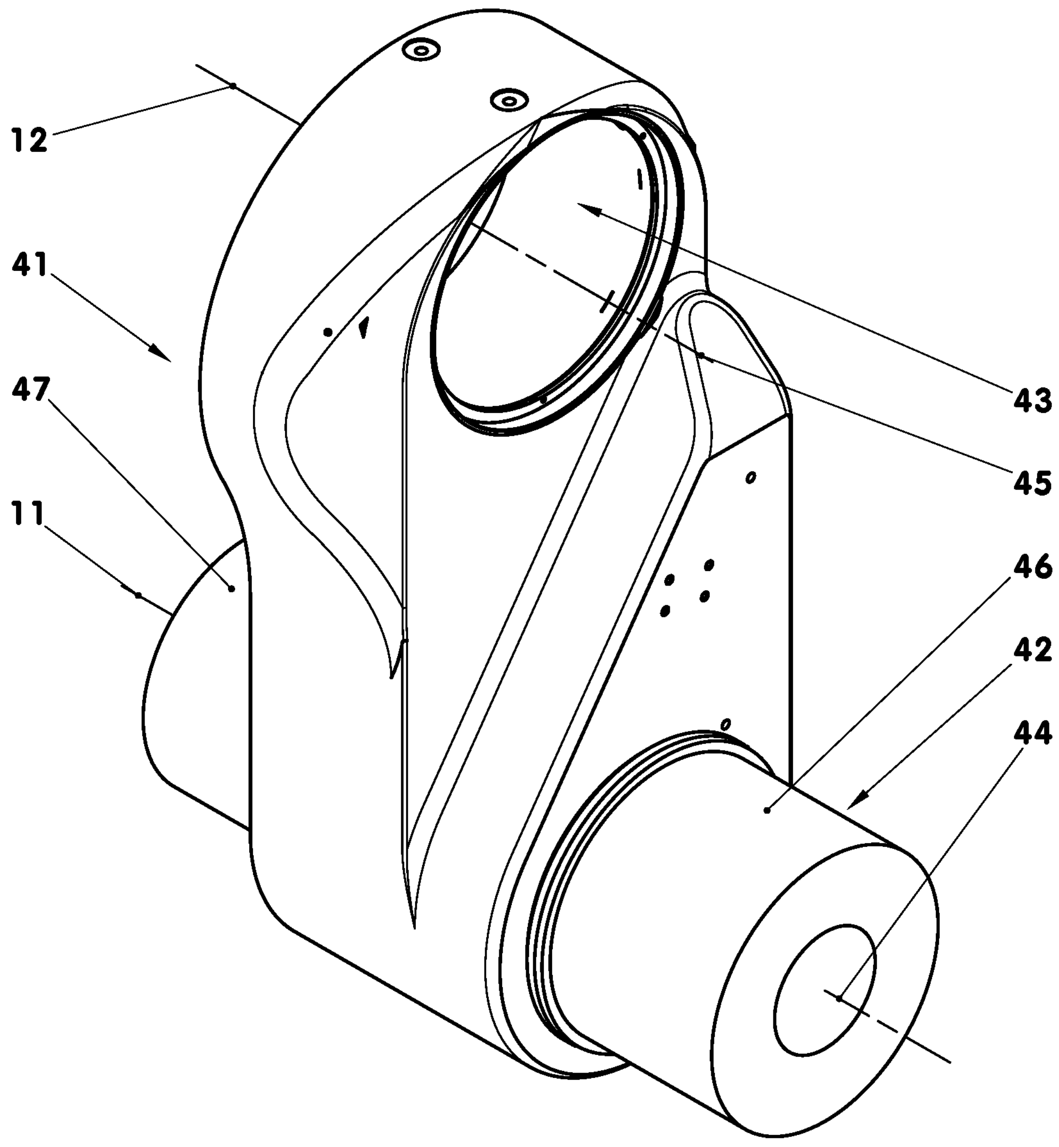
FIG. 3: Foot lever.

FIGS. 1-6 show a machining robot (10) for use in the machining of workpieces (1) by chip removal. Such workpieces (1) are, for example, wooden panels (1), see FIGS. 7 and 8, which rest against a workpiece support frame. For example, the wooden panels (1) have a length of up to 2.50 meters and a width of up to 1.50 meters. The contact surface of the workpiece support frame is inclined to a vertical plane by an angle of up to 30 degrees, for example. The wooden panels (1) may be fixed to the workpiece support frame during machining, for example pneumatically. For this purpose, the workpiece support frame can have suction cups that can be actuated by means of a vacuum pump. The workpieces (1) may also be made of metallic materials, plastics, composites, etc.

For example, a surface (8) or a side surface of the workpiece (1) to be machined forms a working plane. The working plane can be any plane in space that intersects the working space of the machining robot. The working space of the machining robot is formed by the main working space determined by the main axes and the subsidiary working space determined by the subsidiary axes. In the case of a curved workpiece surface, the respective working plane is a tangential plane to the workpiece surface at the respective engagement point of the tool.

The machining robot (10) has the design of a vertical articulated arm robot (10) with two arms (41, 51) forming a kinematic chain. The first arm (41) is a foot lever (41), and the second arm (51) is an elbow lever (51) pivotally mounted on the foot lever (41). In the exemplary embodiment, the machining robot (10) has four degrees of freedom. These are two rotating main axes (11, 12) and two rotating subsidiary axes (13, 14). The machining robot (10) thus has so-called "RR kinematics." A design with more than four degrees of freedom is also conceivable. The machining robot (10) has a base frame (21) that is rigidly mounted, for example, on a foundation base (3), see FIGS. 7 and 8. The machining robot (10) can also be arranged so that it can move in one dimension on a bed (4), see FIG. 10. Thereby, the traverse direction of the machining robot (10) is oriented parallel to the conveying direction of the workpieces (1), for example. With such an embodiment, the traverse drive, for example a torque motor, is arranged in the base frame (21) of the machining robot (10). For example, it has a rolling gear that meshes with a toothed rack arranged on the bed (4).

The base frame (21), see FIG. 2, is designed in a U-shape in the exemplary embodiment. It has, for example, a bearing flange (22) and a support flange (31) arranged thereon. For example, a drive motor for a first pivot axis (11) is arranged in the bearing flange (22). The first pivot axis (11) is first main axis (11) of the machining robot (10). In the support flange (31), for example, the power, signal, and media lines are routed from the base frame (21) to the arms (41, 51).

The bearing flange (22) designed in an L-shape comprises a bearing plate (23) and a support plate (24) oriented at right angles to it. The bearing flange (22) can be made of several parts. The bearing plate (23) is used to fasten the bearing flange (22) to the foundation, for example. The support plate (24) has a bearing holder (25) on its inner side. The bearing holder (25) has a circular cross-section. In the exemplary embodiment, the diameter of the bearing holder (25) amounts to 60% of the distance of the center line (26) of the bearing holder (25) from the bottom surface of the bearing plate (23). For example, the bearing holder (25) is closed on its outer side.

In the exemplary embodiment, the support flange (31) is designed to be plate-shaped. It has a bearing recess (32), the center line of which coincides with the center line (26) of the bearing holder (25). The diameter of the bearing recess (32) amounts to, for example, 92% of the diameter of the bearing holder (25). The center line (26) is parallel to the, for example, flat bottom surface of the bearing plate (23).

The first arm (41) of the machining robot (10) is mounted in the base frame (21). This first arm (41), see FIG. 3, has a first bearing point (42) and a second bearing point (43). The center lines (44, 45) of the two bearing points (42, 43) are parallel to one another. Their distance from one another is, for example, 30% greater than the distance from the center line (26) of the bearing holder (25) to the bottom surface.

The first bearing point (42) has two bearing journals (46, 47) pointing in opposite directions. Both bearing journals (46, 47) are designed to be cylindrical. Their center lines form the center line (44) of the first bearing point (42). The diameter ratio of the bearing journals (46, 47) corresponds, for example, to the diameter ratio of the bearing holder (25) and the bearing recess (32). In use, one bearing journal (46; 47) each is mounted in the bearing holder (25) or in the bearing recess (32), for example in rolling bearings. With the first arm (41) mounted, the center line (26, 44) forms the first pivot axis (11) of the machining robot (10). The usable pivot angle range of the first arm (41) relative to the base frame (21) amounts to, for example, 120 degrees. The usable pivot angle range is the range in which a workpiece (1) can be machined without changing the clamp setup.

In the first arm (41), for example, a drive unit is arranged on one side. On the other side, power, media, and signal lines, for example, are located in the first arm (41). All such lines are routed inside the first arm (41).

Figures 4, 5:
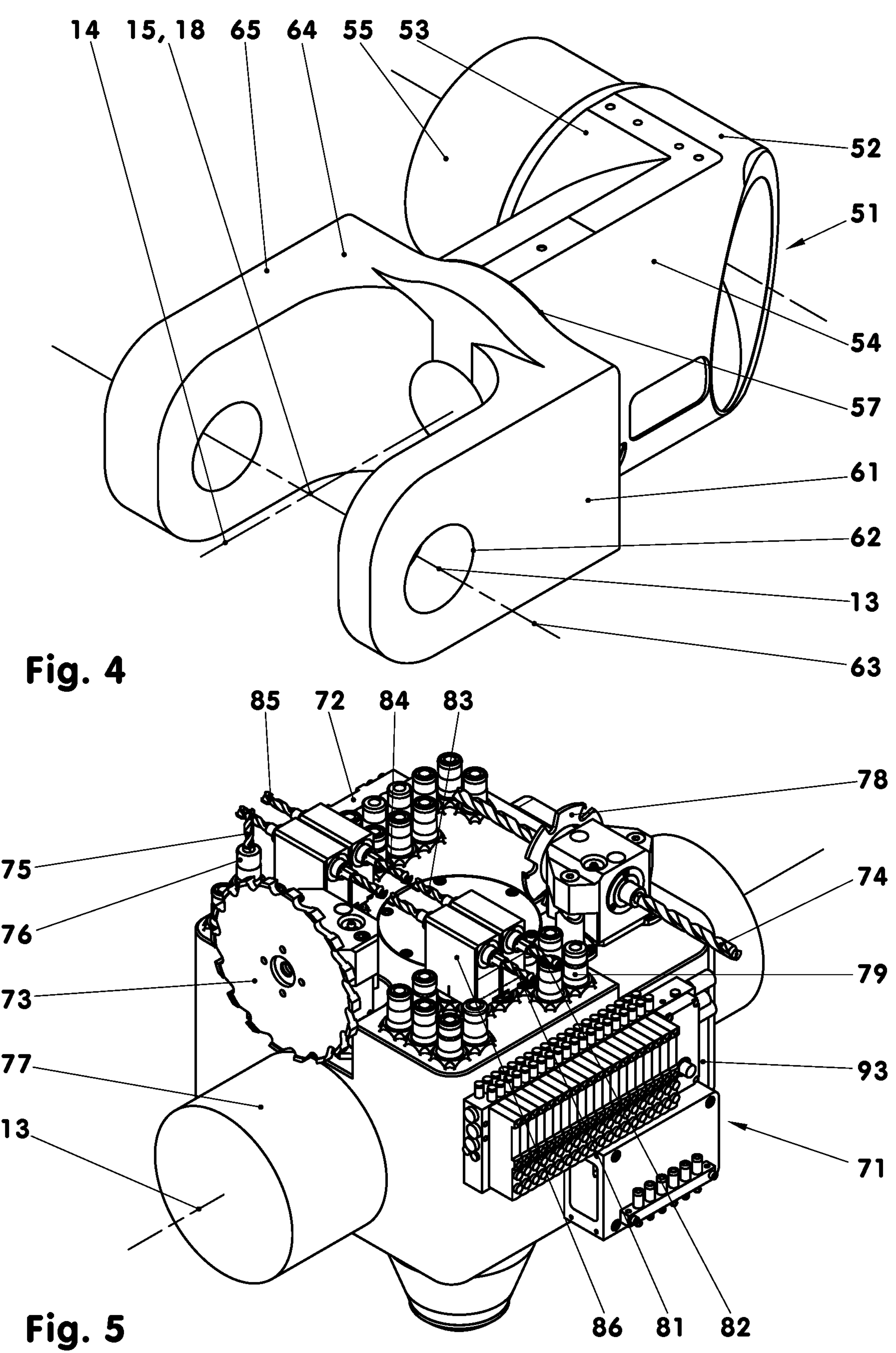
FIG. 4: Elbow lever.
FIG. 5: Machining unit, multihead side.

The second arm (51), see FIG. 4, is mounted in the second bearing point (43). Thereby, the second arm (51) is seated, for example, with a bearing collar (55) in the second bearing point (43). Here, for example, it is supported by means of two rolling bearings, for example angular ball bearings in an O arrangement. The center line (45) of the second bearing point (43) forms a second pivot axis (12) of the machining robot (10). Such second pivot axis (12) is the second main axis (12) of the machining robot (10). Such second main axis (12) is oriented parallel to the first main axis (11). The second arm (51) protrudes from the second bearing point (43) at an angle, for example. It is also conceivable to arrange the second bearing point (43) on both sides of the second arm (51). The first arm (41) is then designed to be fork-shaped in the region of the second bearing point (43), for example. The usable pivot angle range of the second arm (51) relative to the first arm (41) amounts to 115 degrees in the exemplary embodiment. A drive motor for the second arm (51), for example, is arranged at the second bearing point (43). In the region of the second arm (51) as well, the media, signal, power, and data lines are routed within the second arm (51).

In the exemplary embodiment, the end of the second arm (51) turned away from the second bearing point (43) is designed as a partial arm (61) with a receiving part (64). The receiving part (64) has a transverse recess (62). The center axis (63) of the transverse recess (62) forms a third pivot axis (13). The third pivot axis (13) is a second subsidiary axis (13) of the machining robot (10). The height of the receiving part (64), which is designed as a receiving fork (64), amounts to 1.2 times the diameter of the transverse recess (62). The distance of the second pivot axis (12) to the third pivot axis (13) is 7% greater than the distance of the first pivot axis (11) to the second pivot axis (12) in the exemplary embodiment. Such distances of the pivot axes (11, 12; 12, 13) is referred to below as the foot lever length (16) of the foot lever (41) and the elbow lever length (17) of the elbow lever (51). The respective lever length (16; 17) is the length of a common normal to the two respectively associated pivot axes (11, 12; 12, 13). The lever length (17) of the elbow lever (51) is thus at least 5% longer than the lever length (16) of the first arm (41), for example. The elbow lever length (17) ends at the second subsidiary axis (13) in a point of impact (18). The movement of the point of impact (18) is restricted to a normal plane to the first main axis (11). In such normal plane, the movement of such point of impact (18) is bound by the boundaries of the main working space.

The second arm (51) is designed in two parts. It has a bearing part (52) supported in the second bearing point (43) and the fork part (61). The fork part (61) can be pivoted relative to the bearing part (52) about a working axis (14). The working axis (14) oriented, for example, in the longitudinal direction of the second arm (51) is a first subsidiary axis (14) of the machining robot (10). In the exemplary embodiment, such working axis (14) is oriented in the direction of a common normal to the second pivot axis (12) and to the third pivot axis (13), such that the working axis (14) intersects the third pivot axis (13) at a point of intersection (15). Thus, the working axis (14) lies in a plane oriented normal to the first main axis (11). In the exemplary embodiment, the point of intersection (15) coincides with the point of impact (18).

It is also conceivable to arrange the third pivot axis (13) and the working axis (14) at an angle to one another. The line of the shortest distance between the working axis (14) and the third pivot axis (13) then lies in a normal plane to the working axis (14). Such normal plane is a tangential plane to an imaginary cylinder around the first pivot axis (11). In this case, the point of intersection (15) is the point of intersection of said line of the shortest distance with the working axis (14).

The bearing part (52) is designed as an angle piece (52), for example. It has a bearing collar section (53) and a support section (54). The bearing collar section (53) and the support section (54) are oriented at right angles to one another. The bearing collar section (53) comprises the bearing collar (55). On the side turned away from the bearing collar (55), the bearing part (52) can be closed by means of a cover. For example, the support section (54) has a receiving sleeve (57). The fork part (61) sits pivotably in such receiving sleeve (57). For example, there it is mounted on rolling bearings.

The receiving fork (64) has, for example, two tines (65) parallel to one another. The third pivot axis (13) penetrates both tines (65). In the fork part (61), a machining unit (71) is mounted to pivot about the third pivot axis (13). The machining unit (71) can be pivoted around the third pivot axis (13) by at least a pivot angle of 240 degrees.

Figures 6, 7, 8:
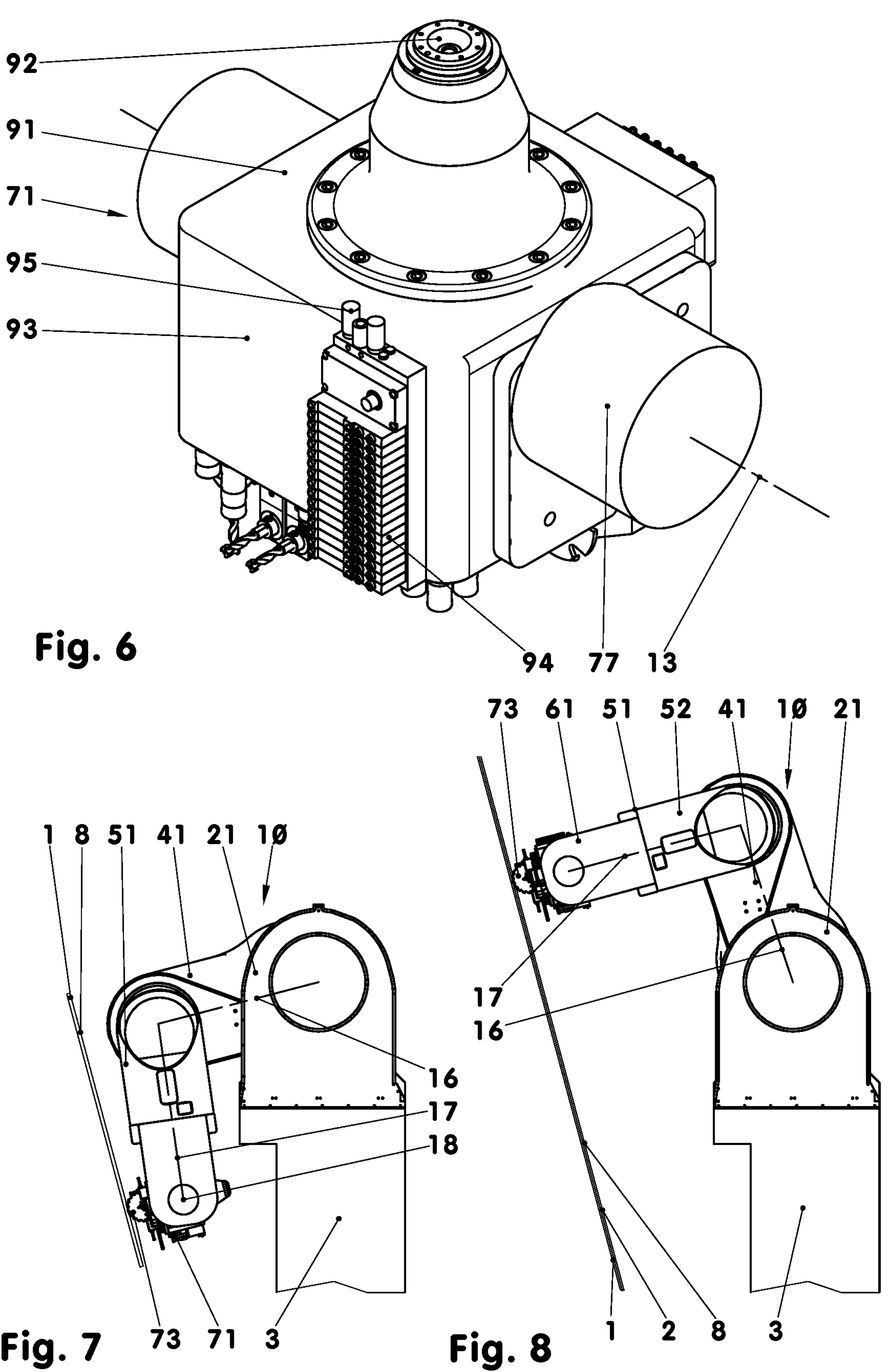
FIG. 6: Machining unit, main spindle side.
FIG. 7: Machining robot during workpiece machining.
FIG. 8: Machining robot in an additional machining position.

FIGS. 5 and 6 show a machining unit (71). The machining unit (71) shown has two trunnions (77) and at least two working sides (72, 91). It has a cuboid enveloping contour, for example. The working sides (72, 91), and optionally additional working sides (93), are arranged on different faces of the machining unit (71). The machining unit (71) is designed as a multifunction unit (71) with a plurality of different types of tools (73-75, 78, 81-85) and tool holders (79, 92). The trunnions (77) are mounted in the transverse recesses (62) when the machining unit (71) is assembled. Thereby, the machining unit (71) is mounted in roller bearings, for example. For example, a pivot drive arranged on the machining unit (71) is used to pivot the machining unit (71) about the third pivot axis (13). This, for example, has a torque motor. The supply lines for power, media, data, and signals are routed within the second arm, for example, and are routed to the machining unit (71) in the region of the trunnions (77).

A first working side (72) of the machining unit (71) is the multihead side (72) located at the top in the illustration of FIG. 5. Sawing tools (73, 78) and drilling tools (74, 75, 81-85), for example, are arranged on this multihead side (72). Grinding tools and milling tools may also be received on the multihead side (72). Such tools have either a geometrically definite cutting edge or a geometrically indefinite cutting edge. All such tools (73, 74, 75, 78, 81-85) can be individually driven in rotation. They may additionally be driven in groups. For example, a group comprises a plurality of similar tools (73, 74, 75, 78, 81-85). A common, simultaneous drive of a plurality of different tools (73, 74, 75, 78, 81-85) is also conceivable. For example, a single drive motor arranged in the machining unit (71) is used for the drive. The individual tools (73-75, 78, 81-85), for example, are coupled to such drive motor. Some of the tools (73, 74) are arranged in a manner normal to the multihead (72). Other tools (74, 81-85) are aligned in a manner parallel to the multihead side (72). In the exemplary embodiment, each of such tools (74, 81-85) lies in a tangential plane to a cylinder about the second subsidiary axis (13). For example, a second sawing tool (78) is oriented normal to the first-mentioned sawing tool (73). With such second sawing tool (78) and with the drilling tools (74, 81-85) arranged parallel to the multihead side (72), the end face of a workpiece (1) can be machined, for example.

In order to insert one of the tools (73-75, 78, 81-85), it is extended into a working position and locked, for example, by means of a sleeve (76, 86) designed as a tool lifting device (76, 86). Thereby, the individual tool lifting device (76, 86) moves normally to the multihead side (72). When the tools (73-75, 78, 81-85) are controlled in groups, a plurality of tool lifting devices (76, 86) is extended. The tools (73-75, 78, 81-85) are used in groups, for example, when inserting a hole pattern into a workpiece (1). Thereby, for example, four simultaneously driven drilling tools (74, 75, 81-85) may be used to drill four holes in the workpiece (1).

Some of the drilling tools (81-85) oriented parallel to the working side (72) are each designed in duplicate. For example, the, for example, identical drilling tool (82) is arranged parallel to the drilling tool (81). Each of such two drilling tools (81, 82) can be extended from the rest position shown into an operating position and locked in place by means of a separate tool lifting device (86). It is also conceivable to arrange more than two tools (81, 82) parallel to one another.

The single one of the tool lifting devices (86) carrying the drilling tools (74, 81-85) lying parallel to the multihead side (72) carries two tools (81, 83) oriented in opposite directions in the illustration of FIG. 5. Thus, the same tool lifting device (86), also referred to as a tool carrier (86), can be used both for machining a right end face and for machining a left end face of a workpiece (1).

Furthermore, several empty sleeves (79) are arranged on the multihead side (72). Tools may be inserted into such empty sleeves (79), for example, by means of a tool changer arranged next to the machining robot (10). The empty sleeves (79) may also receive measuring and test tools.

The main spindle side (91) turned away from the multihead side (72) has a central main spindle holder (92), for example. In this, for example, a large drilling tool or a milling tool can be received. The drivable main spindle holder (92) is designed to be rotatable. For example, the same motor that is used to drive the tools on the multihead side (72) is used as the drive motor. Outside the tool holder (92), the main spindle side (91) in the exemplary embodiment has a torque support (95). The main spindle side (91) can also be designed without torque support (95).

Figure 9:
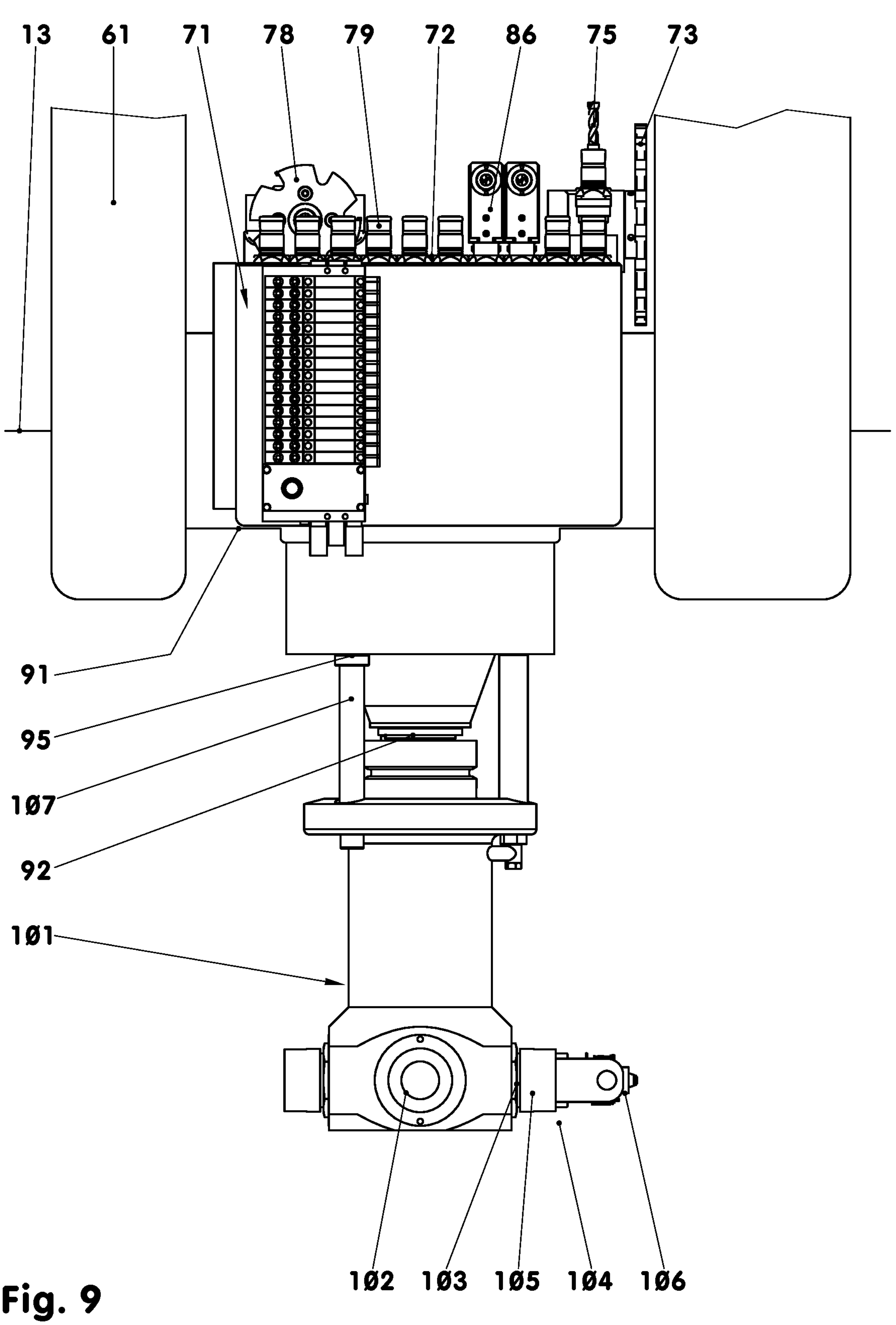
FIG. 9: Machining unit with connected tool unit and multiaxis head.

FIG. 9 shows the multihead unit (71) mounted in the elbow lever (51) with a tool unit (101) received in it. This tool unit (101) is supported by the torque support (95). Thereby, support struts (107) of the tool unit (101) engage around the torque support (95), for example in a form-fit manner. For example, pneumatic, hydraulic, electrical, data, and/or signal lines are passed through the torque support (95). A spindle head of a central spindle of the tool unit (101) engages the main spindle holder (92). In this way, torque is transmitted from the multihead unit (71) via the main spindle mount (92) to the spindle of the tool unit (101). The tool unit (101) has, for example, four tool holders (102, 103) arranged uniformly on a pitch circle normal to the spindle. For example, the spindle is connected to each of such tool holders (102, 103) by means of a bevel gear. For example, drilling tools, milling tools, inspection tools and/or measuring tools may be received in such tool holders (102, 103). Such tools are oriented transversely to the drilling tool (75) of the multihead side, for example. This allows, for example, workpieces (1) to be machined in a clamp setup, which require reclamping of the workpiece (1) when using the multihead unit (71) alone.

In the illustration in FIG. 9, a multiaxis head (104) is seated in a tool holder (103), which is supported on the tool unit (101) by a torque support. The multiaxis head (104) has a head support (105), for example of fork-shaped design, which pivotably supports a head unit (106). In the illustration of FIG. 9, the head unit (106) is similar in design to the multihead unit (71). The above-mentioned tool changer can be used to change and exchange the tool unit (101) and/or the multiaxis head (104) and/or a single tool.

The multihead unit (71) can have additional working sides (93). For example, the two sides connecting the multihead side (72) and the main spindle side (91) may be designed as additional working sides (93). Each additional working side (93) may be arranged on a further face of the machining unit (71). Other tools may be arranged on such sides. In the illustrations of FIGS. 5 and 6, valve blocks 94 and relay plates are arranged on such sides, for example. With such a design of the machining unit (71), it can be pivoted, for example, by a total angle of, for example, 330 degrees about the third pivot axis (13). A pivot angle of up to 450 degrees is also conceivable. This allows continuous machining of workpieces (1) both with tools (73-75, 78) on the multihead side (72) and with tools on the main spindle side (91) or also on the additional sides (93). The maximum pivot angle of the machining unit (71) about the second subsidiary axis (13) is thus greater than the sum of the usable pivot angle range of the first arm (41) about the first main axis (11) and of the usable pivot angle range of the second arm (51) about the second main axis (12).

FIGS. 7 and 8 show the machining robot (10) during machining by chip removal. The tool used is, for example, a rotating sawing blade (73). The workpiece (1) is a wooden panel (1) inclined, for example, at an angle of 15 degrees to the vertical line.

In such exemplary embodiment, the workpiece (1) can be moved relative to the stationary machining robot (10) in a conveying direction oriented normal to the display plane. Moving the workpiece (1) can be done during the main time or during the subsidiary time of machining. For example, when the second sawing blade (78) engages, the workpiece (1) can be moved while the machining unit (71) is stationary. This can be used, for example, to create a slot oriented in the longitudinal direction of the workpiece (1).

In the machining robot (10), the static forces of the machining unit (71) and the arms (41, 51) are transmitted to the base frame (21). The arrangement of such assemblies results in the radial components of such forces being greater than the axial components at least in all bearing points of the first pivot axis (11) and the second pivot axis (12).

The forces acting on the tool during machining are transmitted to the base frame (21) via the tool unit (71) and the pivot bearings. The mass of the machining unit (71) is greater than 100 kilograms, for example. The solid construction and the short lever arms result in a high rigidity of the machining robot (10). The moments acting on the bearing points have short lever arms. Thus, the torque fluctuations during load changes are low.

For example, at the start of a sawing operation, the machining robot (10) and the workpiece (1) are in the position shown in FIG. 7. The base frame (21) stands on a foundation base (3) and is fastened to it. The first arm (41) mounted in the base frame (21) is in its lower end position, for example. In the exemplary embodiment, such end position is bound by the bearing plate (23). In the illustration of FIG. 7, the foot lever length (16) connecting the first pivot axis (11) and the second pivot axis (12) encloses an angle of 105 degrees with an upwardly directed vertical line. The first arm (41) points, for example, in a direction normal to the workpiece (1). The first arm (41) and the second arm (51) enclose an angle of 97 degrees in this illustration. Thereby, the second arm (51) points downward. The machining unit (71) is pivoted relative to the second arm (51) in such a manner that the sawing tool (73) points normally to the workpiece (1). The tool (73) is engaged with the workpiece (1).

Figure 13:
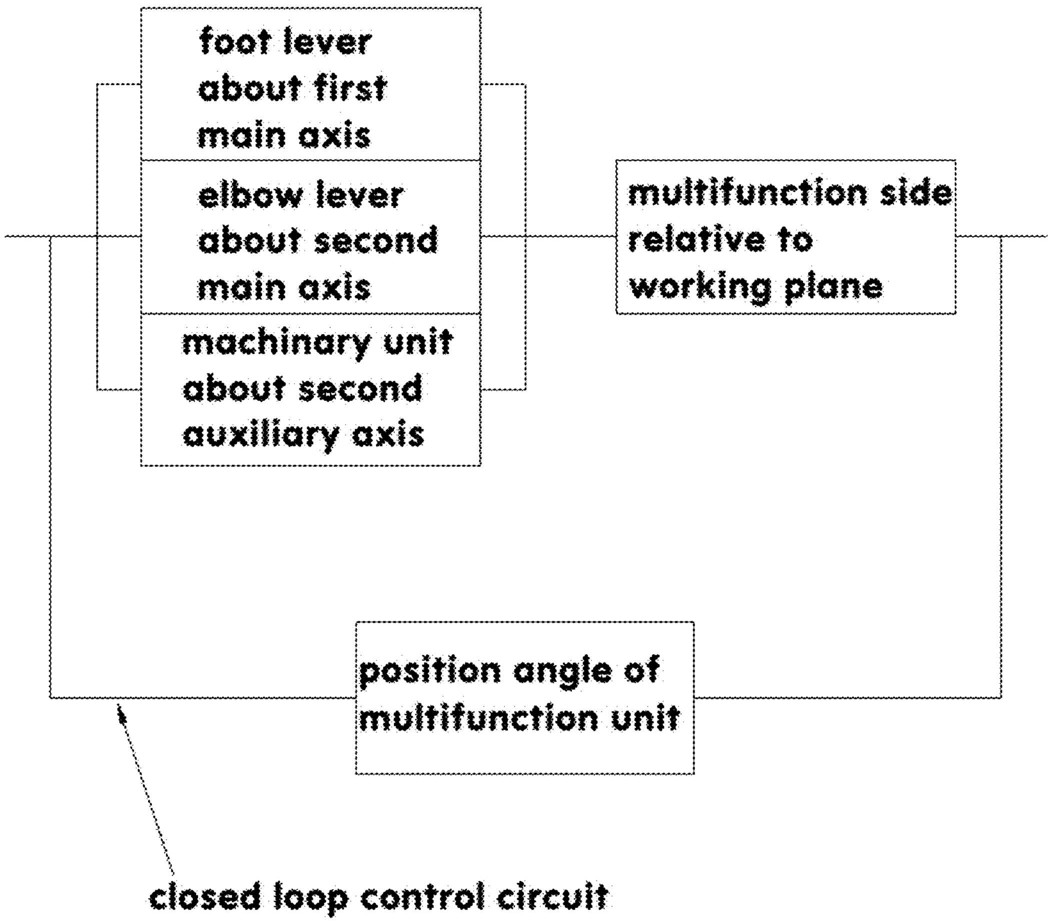
FIG. 13: Closed loop control circuit.

When sawing a straight slot (2) in the workpiece (1), the sawing tool (73) is moved relative to the workpiece (1), for example, from bottom to top. The setting angle that the working side (71) encloses with the working plane, for example the surface of the workpiece (1), remains constant. The setting angle lies in a normal plane to the second subsidiary axis (13). In the exemplary embodiment, such setting angle amounts to zero degrees. The working plane is parallel to the working side (72) of the multifunction unit (71) in the illustrations of FIGS. 7 and 8. The tool (73) is thus guided along a straight path of movement by means of the serial kinematics. For this purpose, at least pivoting motions about the first main axis (11), the second main axis (12) and the second subsidiary axis (13) are controlled by a common closed-loop control circuit as illustrated in FIG. 13. Thereby, the movement of the second subsidiary axis (13) is adjusted at any point in time during the process as a function of the pivot angle of the first main axis (11) and the pivot angle of the second main axis (13). Thereby, for example, the position angle of the multifunction unit (71) in space is recorded as a control variable. For the continuous determination of the setting angle of the working side (72, 91, 93) to the working plane, an acceleration sensor of the piezoresistive accelerometer type is used, for example. For example, this has an analog output signal, for example between 4 to 20 milliamps. The point of intersection (15) and the point of impact (18) move parallel to the workpiece (1) during the machining shown. The track of the point of intersection (15) runs in a plane oriented normal to the first pivot axis (11).

The tools (73, 75) oriented normal to the multihead side (72) and the tools carried on the main spindle side (92) are each movable by means of the pivot axes (11, 12, 13) and the working axis (14) within a space bounded by two planes parallel to one another. Each of such planes is normal to the first pivot axis (11). The distance between the two bounding planes for the individual tool (73; 74) corresponds to twice the distance of the respective tool (73; 74) from the working axis (14). The subsidiary working space for the individual tool (73, 75, 78) determined by the degrees of freedom of the subsidiary axes (13, 14) is a sum of both partial subsidiary working spaces. For example, it results in a tangential circle to a normal to the second subsidiary axis (13), wherein the partial subsidiary working space delineated by the second subsidiary axis (13) delineates a circular line segment about such second subsidiary axis (13). The center line of the tangential circle is the first subsidiary axis (14). The subsidiary working space thus results, for example, in a cylinder jacket section around the second subsidiary axis (13).

During the sawing process shown, the first arm (41) pivots clockwise around the first pivot axis (11) in the illustration of FIG. 7. The second arm (51) is initially pivoted counterclockwise relative to the first arm (41). Thereby, the angle enclosed by the first arm (41) and the second arm (51) is reduced. Subsequently, with further clockwise rotation of the first arm (41), the second arm (51) is also pivoted clockwise. Thereby, the third pivot axis (13) moves parallel to the workpiece (1). The tool unit (71) is pivoted in each case such that a normal to the respective machining side (72; 91; 93) is normal to the workpiece (1). Thus, the workpiece (1) can be machined without interruption and at a constant path speed. In the illustrated exemplary embodiment, the pivot angle range of the first arm (41) relative to the base frame (21) amounts to 86 degrees. The pivot angle range of the second arm (51) relative to the first arm (41) amounts to 35 degrees. The pivot angle range that the machining unit (71) pivots relative to the second arm (51) in such exemplary embodiment amounts to 83 degrees. For example, a Denavit-Hartenberg transformation is used for the programming of the path control.

At the end of machining, the machining robot (10) is in the position shown in FIG. 8, for example. The tool (73) can now be lifted off the workpiece (1).

To machine the workpiece (1) in another region of its longitudinal axis, the workpiece (1) is moved in the conveying direction. Thereby, for example, when using the transverse sawing blade (78), such tool (78) can remain engaged. While the workpiece (1) is being moved, the position of the multifunction unit (71) in space remains unchanged, for example. This allows, for example, a slot oriented in the longitudinal direction of the workpiece to be introduced into the workpiece (1).

In order to create a hole pattern from the top (8) of the workpiece (1), for example, drilling tools are inserted into a plurality of the empty sleeves (79). Prior to tool engagement, the tools are moved to the machining position and set in rotation, and the setting angle of the multifunction unit (71) relative to the working plane is set. While maintaining the setting angle, the arms (41, 51) of the machining robot (10) are moved such that all tools penetrate the workpiece (1) in the same direction, for example in the normal direction. The return stroke of the tools is also performed while maintaining the setting angle between the multifunction unit (71) and the working plane. Subsequently, additional, for example, identical hole patterns may be introduced into the workpiece (1) after traversing the arms (41, 51) of the machining robot (10) and/or after traversing the workpiece (1) in the longitudinal direction of the workpiece.

For example, to produce a group of end-face depressions in the workpiece (1), the transverse drilling tools (81) and (82) are used. After the extension of the tools to the operating position, their coupling to the drive motor and the positioning of multifunction unit (71) in space, the workpiece (1) moves in the direction of the rotating tools (81, 82) in the feed operating mode. During the return stroke, the workpiece (1) is moved out of the drilling tools (81, 82) again. In order to generate additional, for example, identical drilling patterns, the multifunction unit (71) can be moved to a new location within the main working space while maintaining its setting angle to the working plane. Thereby, the control loop of the two main axes (11, 12) and the second auxiliary axis (13) ensures that the setting angle of the multifunction unit (71) remains constant relative to the working plane. Now, the workpiece (1) can again move towards the rotating tools (81, 82) in the feed operating mode.

Figures 10, 11:
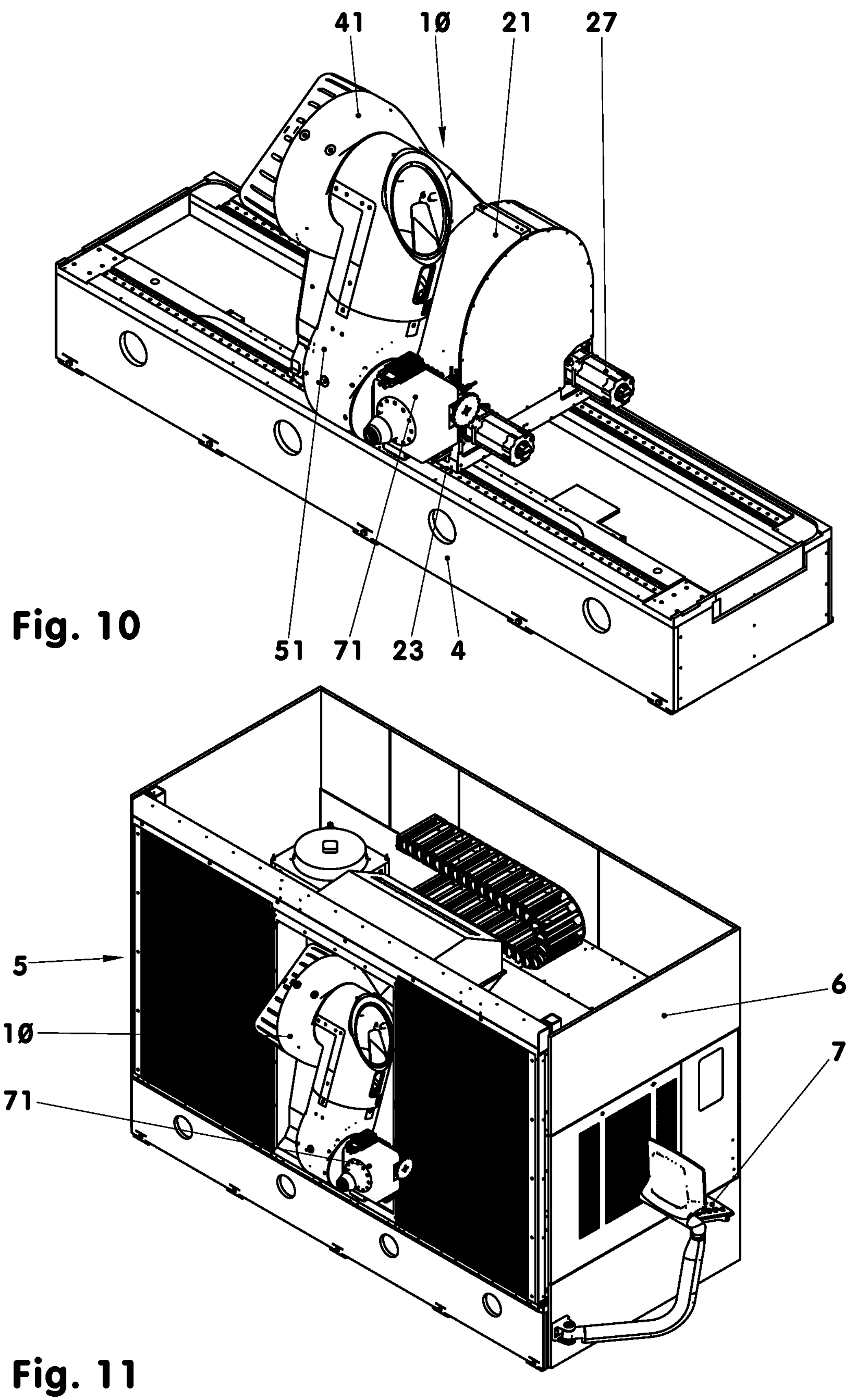
FIG. 10: Movable machining robot with bed.
FIG. 11: Robot cell with machining robot.
Figure 12:
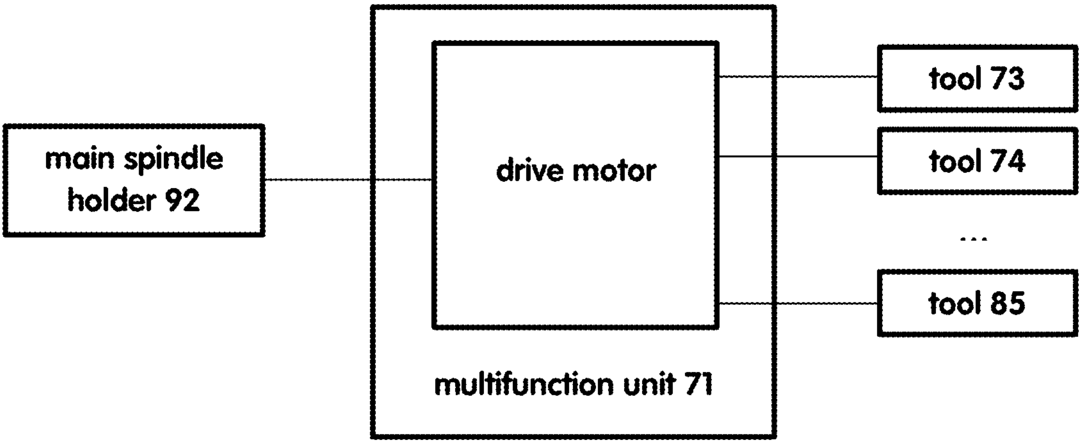
FIG. 12: Drive motor couplable to tools.

FIG. 10 shows an additional machining robot (10) This is largely constructed in the same manner as the machining robot (10) shown in FIGS. 1-8. The second partial arm (61) of the second arm (51) has a receiving part (64) in which the machining unit (71) is mounted in a cantilevered manner.

The machining robot (10) has a bearing plate (23) designed as a carriage. With this, it stands longitudinally adjustable on a bed (4). The machining robot (10) can be moved in the common direction of the first pivot axis (11) and the second pivot axis (12). It can also be adjustable in steps, for example. For example, two traverse motors (27) are arranged on the base frame (21) for this purpose. In the case of upright traverse motors (27), the base frame (21) is clamped to the bed (4), for example under spring load. To move, the clamps are pneumatically released, for example. Another design of the clamps is also conceivable.

In this exemplary embodiment, a feed oriented in the workpiece conveying direction can be performed both by moving the workpiece (1) and by moving the machining robot (10) relative to the bed (4). A combination of both traverse movements oriented parallel to one other is also conceivable.

FIG. 11 shows a robot cell (5) with a machining robot (10). Thereby, the machining robot (10) can be arranged on a foundation (3) or on a bed (4). It can, for example, be designed according to one of the aforementioned embodiments.

The robot cell (5) has an enclosure (6) that, in the illustration of FIG. 11, surrounds the machining robot (10) on at least three sides. On the fourth side, at least the machining unit (71) protrudes from the, for example, cuboid enveloping contour of the enclosure (6).

The operating elements (7) of the robotic cell (5) are arranged on the outer side of the enclosure (6). This is used, for example, to control the machining robot (10).

Combinations of the individual exemplary embodiments are also conceivable.

LIST OF REFERENCE SIGNS

1 Workpiece, wooden panel
2 Straight slot in (1)
3 Foundation base
4 Frame
5 Robot cell
6 Enclosure
7 Operating elements
8 Surface of (1)
10 Machining robot, vertical articulated arm robot
11 First pivot axis, first main axis
12 Second pivot axis, second main axis
13 Third pivot axis, second subsidiary axis
14 Working axis, first subsidiary axis
15 Point of intersection between (13) and (14)
16 Foot lever length
17 Elbow lever length
18 Point of impact between (13) and (17)
21 Base frame
22 Bearing flange
23 Bearing plate
24 Support plate
25 Bearing holder
26 Center line of (25)
27 Traversing motors
31 Support flange
32 Bearing recess
41 First arm, foot lever
42 First bearing point
43 Second bearing point
44 Center line of (42)
45 Center line of (43)
46 Bearing journal
47 Bearing journal
51 Second arm, elbow lever
52 Bearing part, angle piece, partial arm of (51)
53 Bearing collar section
54 Support section
55 Bearing collar
57 Receiving sleeve
61 Fork part, partial arm of (51)
62 Transverse recess

63 Center line of (62)
64 Receiving part, receiving fork
65 Tines
71 Machining unit, multihead unit
72 Machining side, multihead side
73 Tool, sawing tool, sawing blade
74 Tool, drilling tool
75 Tools
76 Tool lifting device, sleeve
77 Trunnion
78 Tool, sawing tool
79 Empty sleeves
81 Tool, drilling tool
82 Tool, drilling tool
83 Tool, drilling tool
84 Tool, drilling tool
85 Tool, drilling tool
86 Tool lifting device
91 Working side, main spindle side
92 Main spindle holder
93 Additional working side of (71)
94 Valve block
95 Torque support
101 Tool unit
102 Tool holders
103 Tool holder
104 Multiaxis head
105 Head support
106 Head unit
107 Support struts

The invention claimed is:

1. A machining robot (10) for machining workpieces (1) by chip removal, the machining robot comprising:

a base frame (21);

a foot lever (41) mounted in the base frame and pivotable about a first main axis (11);

an elbow lever (51) mounted at a free end of the foot lever (41) and pivotable about a second main axis (12), the second main axis (12) being parallel to the first main axis (11), the elbow lever (51) extending in a longitudinal direction along a first subsidiary axis (14), the elbow lever (51) comprising a receiving fork (64) having two tines (65); and a machining unit (71) mounted in the elbow lever (51) and pivotable about a second subsidiary axis (13), the machining unit (71) is a multifunction unit (71) having a cuboid body, the second subsidiary axis (13) passing through the two tines (65) of the receiving fork (64) and through the cuboid body of the machining unit (71), wherein the cuboid body of the multifunction unit (71) has at least two working sides (72, 91, 93) disposed on different faces of the cuboid body of the machining unit (71), the at least two working sides including a multifunction side (72), and a main spindle side (91) comprising a main spindle holder (92) configured to receive and rotationally drive a tool spindle, wherein the cuboid body of the multifunction unit (71) is pivotable about the second subsidiary axis (13) to selectively bring each of the multifunction side (72) and the main spindle side (91) into a machining position, wherein the multifunction side (72) comprises at least two chip removal tools (73-75, 78, 81-85), wherein the at least two chip removal tools (73-75, 78, 81-85) can be driven for rotation individually, or in groups, wherein each of the at least two chip removal tools (73-75, 78, 81-85) can be raised and lowered relative to the multifunction side (72) by a respective tool carrier (76; 86) receiving a respective one of the at least two chip removal tools (73-75, 78, 81-85), and wherein pivoting motions of the foot lever (41) about the first main axis (11), the elbow lever (51) about the second main axis (12), and the machining unit (71) about the second subsidiary axis (13)

are controlled via a control circuit.

2. The machining robot (10) according to claim 1, wherein an elbow lever length (17) defined by a distance of the second main axis (12) from the second subsidiary axis (13) is greater than a foot lever length (16) defined by a distance of the first main axis (11) from the second main axis (12).

3. The machining robot (10) according to claim 2, wherein an intersection point (18) at an intersection of an elbow lever (17) length axis and the second subsidiary axis (13) can move only in a plane perpendicular to the first main axis (11).

4. The machining robot (10) according to claim 1, wherein the elbow lever (51) has a first partial arm (52) and a second partial arm (61), the second partial arm (61) being pivotable relative to the first partial arm (52) about the first subsidiary axis (14), wherein the first partial arm (52) is mounted in the foot lever (41), and wherein the second partial arm (61) supports the multifunction unit (71).

5. The machining robot (10) according to claim 4, wherein the second partial arm (61) of the elbow lever (51) is a fork part (61) in which the multifunction unit (71) is mounted, which fork part (61) comprises the receiving fork (64).

6. The machining robot (10) according to claim 1, wherein at least one of the at least two chip removal tools (73-75, 78, 81-85) is a rotatable sawing tool (73).

7. The machining robot (10) according to claim 1, wherein the multifunction unit (71) comprises a drive motor, and wherein the drive motor is couplable to the at least two chip removal tools (73-75, 78, 81-85) and to the main spindle holder (92).

8. The machining robot (10) according to claim 1, wherein the machining robot (10) is arranged on a bed (4), and wherein the machining robot (10) is translationally movable and/or translationally adjustable, and wherein translational movement and/or translational adjustment takes place in the longitudinal direction of a straight line containing the first main axis (11).

9. The machining robot (10) according to claim 1, wherein the machining robot (10) is part of a robot cell (5), and wherein the robot cell (5) has an enclosure (6) and external controls (7).

10. The machining robot (10) according to claim 1, wherein the wherein the main spindle side (91) comprises a torque support (95), and wherein a tool unit (101) supported on the torque support (95) and having a spindle and having at least one tool holder (102; 103) can be received on the main spindle side (91).

11. The machining robot (10) according to claim 1, wherein the multifunction unit (71) has two trunnions (77) projecting from opposite sides of the cuboid body, and wherein the two trunnions (77) are mounted in transverse recesses (62) of the receiving fork (64) such that the multifunction unit (71) is pivotable relative to the receiving fork (64) about the second subsidiary axis (13).

12. The machining robot (10) according to claim 1, wherein the control circuit is a closed-loop control circuit.

13. The machining robot (10) according to claim 12, wherein the pivoting motions of the foot lever (41) about the first main axis (11), the elbow lever (51) about the second main axis (12), and the machining unit (71) about the second subsidiary axis (13)

are controlled via the closed-loop control circuit such that the multifunction side (72) can be moved relative to a working plane at a constant setting angle enclosed between the multifunction side (72) and the working plane.

* * * * *